United States Patent
Choi et al.

(10) Patent No.: US 11,342,543 B2
(45) Date of Patent: May 24, 2022

(54) APPARATUS AND METHOD FOR ACTIVATING BATTERY CELL

(71) Applicant: LG CHEM, LTD., Seoul (KR)

(72) Inventors: Jong Hwan Choi, Daejeon (KR); Eun Ju Lee, Daejeon (KR); Ji Eun Lee, Daejeon (KR); Ye Jin Nam, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 158 days.

(21) Appl. No.: 16/606,096

(22) PCT Filed: Nov. 28, 2018

(86) PCT No.: PCT/KR2018/014804
§ 371 (c)(1),
(2) Date: Oct. 17, 2019

(87) PCT Pub. No.: WO2019/107908
PCT Pub. Date: Jun. 6, 2019

(65) Prior Publication Data
US 2020/0044233 A1 Feb. 6, 2020

(30) Foreign Application Priority Data
Nov. 30, 2017 (KR) .................. 10-2017-0163720

(51) Int. Cl.
*H01M 10/44* (2006.01)
*H01M 4/04* (2006.01)
(Continued)

(52) U.S. Cl.
CPC ......... *H01M 4/0447* (2013.01); *H01M 4/505* (2013.01); *H01M 4/525* (2013.01); *H01M 10/058* (2013.01)

(58) Field of Classification Search
CPC .. H01M 4/0447; H01M 4/044; H01M 4/0445; H01M 4/505; H01M 4/525;
(Continued)

(56) References Cited

U.S. PATENT DOCUMENTS 7,510,804 B2 * 3/2009 Hamano ............... H01M 4/131
429/231.1
8,343,666 B2 * 1/2013 Muraoka ............... H01M 4/131
429/231.95
(Continued)

FOREIGN PATENT DOCUMENTS

CN 106328871 A 1/2017
CN 206038583 U 4/2017
(Continued)

OTHER PUBLICATIONS

International Search Report (PCT/ISA/210) issued in PCT/KR2018/014804, dated Mar. 4, 2019.
(Continued)

*Primary Examiner* — Raymond Alejandro
(74) *Attorney, Agent, or Firm* — Birch, Stewart, Kolasch & Birch, LLP

(57) ABSTRACT

A method for activating a battery cell. The battery cell includes a positive electrode coated with a nickel cobalt manganese (NCM) positive electrode material, into which lithium nickel oxide (LNO) has been added or mixed. The method includes a step of charging the battery cell; and a step of discharging the battery cell, when, in the step of charging the battery cell, the battery cell is charged under a charging condition of C-rate of 0.1 C to 0.5 C in a state of being heated at a temperature of 45° C. to 60° C. When the activation process is performed according to the present invention having the above-described configuration, the pressing/heating conditions for suppressing generation of a gas may be provided to prevent swelling, battery deforma-
(Continued)

tion, and performance deterioration due to the generation of the gas from occurring.

7 Claims, 4 Drawing Sheets

(51) Int. Cl.
*H01M 4/505* (2010.01)
*H01M 4/525* (2010.01)
*H01M 10/058* (2010.01)

(58) Field of Classification Search
CPC .......... H01M 10/058; H01M 10/0587; H01M 10/446; H01M 10/44
See application file for complete search history.

(56) References Cited

U.S. PATENT DOCUMENTS

| | | | |
|---|---|---|---|
| 2015/0093567 A1 | 4/2015 | Jeon | |
| 2017/0005308 A1 | 1/2017 | Fujii | |
| 2017/0059662 A1* | 3/2017 | Cha | G01R 31/3842 |
| 2017/0066217 A9 | 3/2017 | Jeon | |

FOREIGN PATENT DOCUMENTS

| | | | |
|---|---|---|---|
| EP | 3 113 247 | A1 | 1/2017 |
| JP | 10-199565 | A | 7/1998 |
| JP | 2003-297354 | A | 10/2003 |
| JP | 2016-81790 | A | 5/2016 |
| KR | 10-2007-0082379 | A | 8/2007 |
| KR | 10-2011-0118225 | A | 10/2011 |
| KR | 10-2013-0102647 | A | 9/2013 |
| KR | 10-2014-0033748 | A | 3/2014 |
| KR | 10-2015-0015303 | A | 2/2015 |
| KR | 10-2015-0037049 | A | 4/2015 |
| KR | 10-2015-0082957 | A | 7/2015 |
| KR | 10-2015-0144886 | A | 12/2015 |
| KR | 10-2017-0003392 | A | 1/2017 |
| KR | 10-1713042 | B1 | 3/2017 |
| KR | 10-1713068 | B1 | 3/2017 |
| KR | 10-2017-0101582 | A | 9/2017 |

OTHER PUBLICATIONS

Extended European Search Report dated Jul. 27, 2020 for Application No. 18882719.0.

* cited by examiner

-PRIOR ART-

APPARATUS AND METHOD FOR ACTIVATING BATTERY CELL

CROSS-REFERENCE TO RELATED APPLICATION

The present application claims the benefit of the priority of Korean Patent Application No. 10-2017-0163720, filed on Nov. 30, 2017, which is hereby incorporated by reference in its entirety.

TECHNICAL FIELD

The present invention relates to an apparatus and method for activating a battery cell, and more particularly, to an apparatus and method for activating a battery cell, which heat (and/or a pressure) is applied to the battery cell to reduce an activation time and gas generation during an activation process.

BACKGROUND ART

In recent years, as technology development and demands for mobile devices increase, the demands for secondary batteries as energy sources are rapidly increasing. Such a secondary battery may be used in the form of a single battery cell or in the form of a battery module in which a plurality of unit cells are electrically connected to each other according to a type of external devices. For example, small devices such as mobile phones operate for a predetermined time with an output and capacity of one battery cell. On the other hand, medium or large devices such as notebook computers, portable DVDs, personal computers, electric vehicles, hybrid electric vehicles, etc., requires the use of battery modules comprising a large number of battery cells due to their output and capacity issues.

Such a secondary battery is manufactured through a process of assembling a battery cell and a process of activating the battery. Here, the battery activation process is usually performed by applying necessary current to the battery cell to be charged/discharged through a charging/discharging device comprising positive and negative electrode contact devices.

As illustrated in FIG. 1, the charging/discharging apparatus of the secondary battery comprises a tray 20 into which battery cells 10 are individually accommodated or fitted to be fixed and contact devices 30 and 40 connected to a positive electrode 11 and a negative electrode of each of the battery cells 10 fixed to the tray 20 to charge/discharge the battery cells 10. The contact devices 30 and 40 may have a structure comprising contact pins 31 and 41 disposed with the tray 20 therebetween so as to be electrically connected to the positive electrode 11 or the negative electrode 12.

A nickel (Ni)-based NCM positive electrode material (NiCoMn: nickel cobalt manganese positive electrode material) has been widely used because of high energy density, a long lifetime, and durability thereof. Also, LNO ($LiNiO_2$: lithium nickel oxide) may be added so that a lithium content increases to further increase in energy density.

However, there has been a problem that a gas is generated in the battery cell due to a phase change of the LNO in a state in which unreacted lithium byproducts remain in a raw material required when the LNO is manufactured.

The gas generated in the battery cell may act as resistance or cause deformation of a battery module and a battery pack, and thus, a failure rate of products increases. Particularly, in the case of a pouch type secondary battery having a relatively soft case rather than a can type secondary battery having a relatively rigid case, the deformation due to the gas generation is more serious.

DISCLOSURE OF THE INVENTION

Technical Problem

Thus, to solve the above-described problem, an object of the present invention is to provide an apparatus and method for activating a battery cell, in which a gas is minimally generated in a positive electrode coated with a nickel cobalt manganese positive electrode material into which lithium nickel oxide (LNO) is added or mixed.

Technical Solution

To achieve the above object, the present invention provides a method for activating a battery cell, which activates the battery cell comprising a positive electrode coated with a nickel cobalt manganese (NCM) positive electrode material, into which lithium nickel oxide (LNO) is added or mixed, the method comprising: a step of charging the battery cell; and a step of discharging the battery cell, wherein, in the step of charging the battery cell, the battery cell is charged under a charging condition of C-rate of 0.1 C to 0.5 C in a state of being heated at a temperature of 45° C. to 60° C.

In more detail, the battery cell may be charged under a charging condition of C-rate 0.2 C in a state of being heated at a temperature of 45° C. to 60° C.

The battery cell may be charged in a state of being fully discharged at a charging rate of 0%, and a first pressure applied to the battery cell in a first charging interval, which is determined from a charging rate of 0% to a reference charging rate and a second pressure applied to the battery cell in a second charging interval, which is determined from the reference charging rate to a charging rate of 100% are different, wherein the second pressure may be higher than the first pressure.

In this embodiment of the present invention, the first pressure is set at a pressure less than 0.1 $kgf/cm^2$, and the second pressure is set at a pressure of 0.1 $kgf/cm^2$ to 0.5 $kgf/cm^2$.

Also, the reference charging rate is set within a range of a charging rate of 10% to 20%, more particularly, a charging rate of 15% to 19%.

Furthermore, the present invention further provides an apparatus for activating a battery cell. The apparatus for activating a battery cell, which activates the battery cell comprising a positive electrode coated with a nickel cobalt manganese (NCM) positive electrode material, into which lithium nickel oxide (LNO) is added or mixed, comprises: a heating plate fitted between two or more laminated battery cells to heat the battery cells; and a pressing device pressing the battery cells in a laminated direction to apply a pressure to each of the battery cells.

The heating plate may press and heat the battery cell at the same time to provide the two functions at the same time. That is, the pressing device may not be separately provided but be combined with the heating plate.

Also, the apparatus may further comprise a thermometer measuring a temperature of the battery cell heated by the heating plate and a pressure gauge measuring a pressure applied to the battery cell by the pressing device.

Advantageous Effects

When the activation process is performed according to the present invention having the above-described configuration, the pressing/heating conditions for suppressing the generation of the gas may be provided to prevent the swelling, the battery deformation, and the performance deterioration due to the generation of the gas from occurring.

That is, even though the LNO is added to the nickel (Ni)-based NCM positive electrode material so as to improve the performance, the conventional problems due to the generation of the gas may be solved.

MODE FOR CARRYING OUT THE INVENTION

Figure 1:
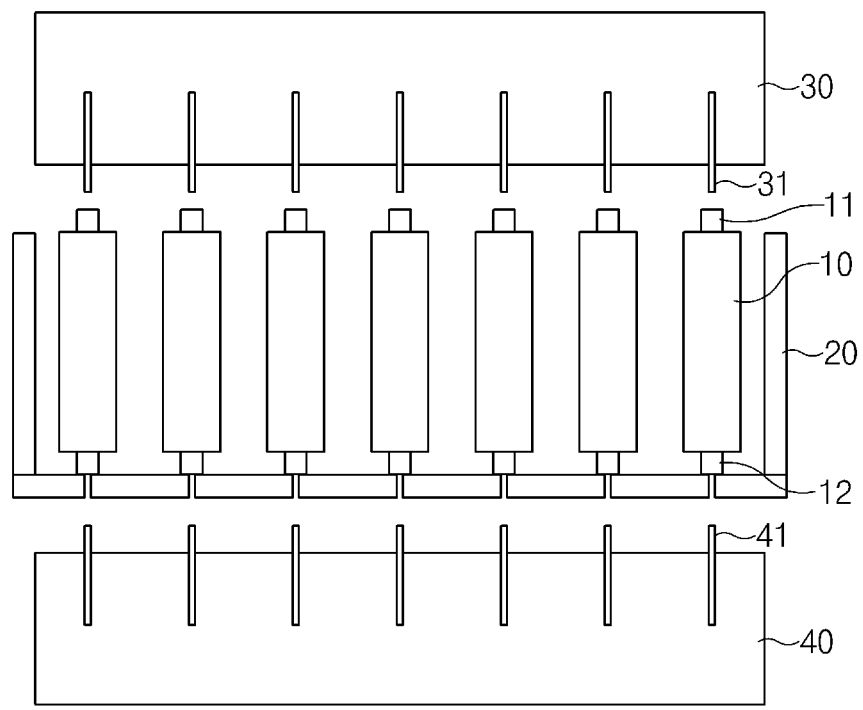
FIG. 1 is a simplified schematic view of an activation apparatus according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an apparatus and method for activating a battery cell in which an electrode assembly and an electrolyte are inserted/injected into a case and provides an apparatus and method capable of reducing generation of an internal gas and reducing an activation time when compared to the structure according to the related art. Particularly, according to the present invention, when a nickel cobalt manganese (NCM) positive electrode material, into which lithium nickel oxide (LNO) is added or mixed as a positive electrode activation material, is applied to a positive electrode constituting the electrode assembly, a more effect may be achieved. Hereinafter, embodiments according to the present invention will be described in detail with reference to the accompanying drawings.

Embodiment 1

Figure 2:
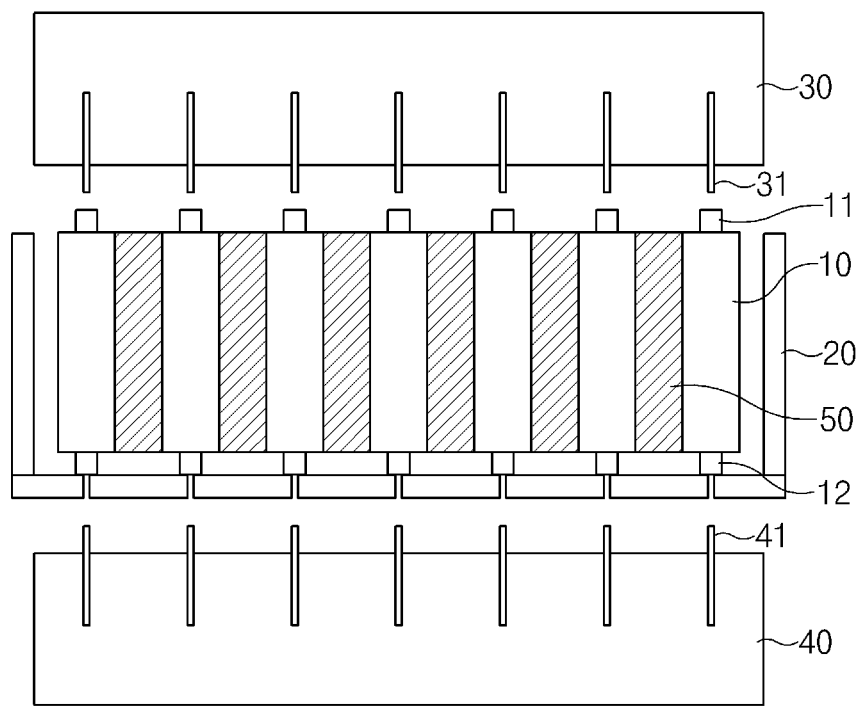
FIG. 2 is a simplified view of an activation apparatus according to the present invention so as to illustrate a state in which a pressing device is integrated with a heating plate.
Figure 3:
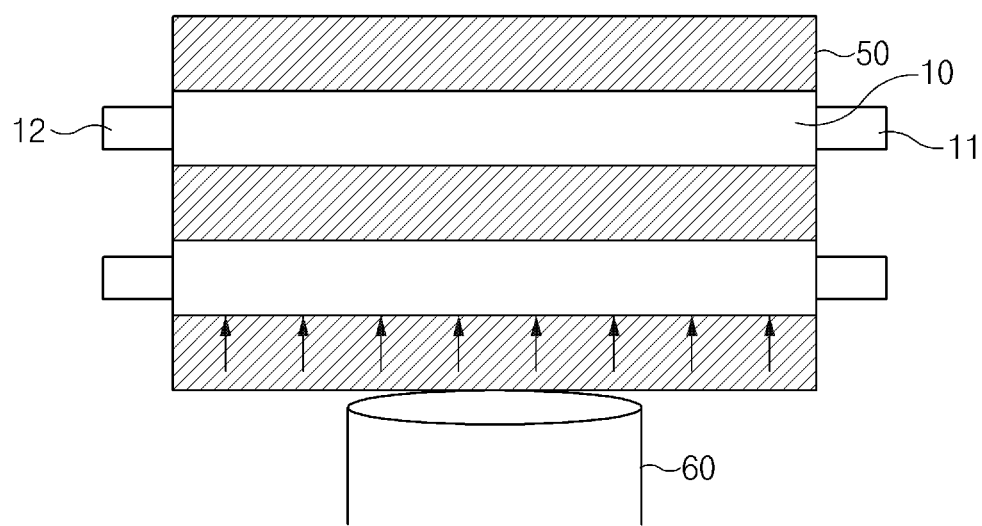
FIG. 3 is a simplified schematic view illustrating a state in which the heating plate and the pressing device are separated from each other.

Referring to FIGS. 2 and 3, an apparatus for activating a battery cell according to Embodiment 1 of the present invention comprises a tray 20 into which battery cells 10 are individually accommodated or fitted to be fixed and contact devices 30 and 40 connected to a positive electrode 11 and a negative electrode of each of the battery cells 10 fixed to the tray 20 to charge/discharge the battery cells 10 and further comprises a heating plate 50 fitted between the two or more laminated battery cells 10 to heat the battery cells 10 and a pressing device 60 pressing the battery cells 10 in a laminated direction to apply a pressure to each of the battery cells 10.

Here, the heating plate 50 may perform the two functions of pressing and heating the battery cells 10 at the same time according to the required design. That is, the pressing device 60 may not be separately provided but be combined with the heating plate 50.

For example, as illustrated in FIG. 2, the heating plate 50 with which the pressing device 60 is combined may be performed in a manner in which the battery cells 10 are pressed as the heating plate 50 increases in thickness in a state in which the heating plates 50 and the battery cells 10 are alternately disposed adjacent to each other.

Alternatively, as illustrated in FIG. 3, the pressing device 60 applies force to the heating plate 50 or the battery cell 10, which is disposed at the outermost one side, in a direction of the other side so that the whole battery cells 10 are pressed at the same time. Here, the pressure may be applied to all the battery cells 10. For reference, since the above-described manner in which the heating plate 50 increases in thickness is complicated in configuration, the manner in which the whole battery cells 10 move in the direction of the other side by the pressing device 60 disposed at the outermost one side so that all the whole battery cells 10 are pressed at the same time may be simple in configuration and advantageous in terms of workability.

Here, the heating of the heating plate 50 may be performed through a heating wire, a heating element, or the like which is well known. The pressing of the heating plate 50 and/or the pressing device 60 may be performed by being coupled to a hydraulic, pneumatic, electronic device, or the like, which is well known.

In the even configuration in which the pressing device 60 is separated, the heating plate 50 may be arranged between the respective battery cells 10 in the same configuration, and when the pressing device 60 operates, the tray 20 may be deformed to prevent an interference from occurring.

Furthermore, in this embodiment, a thermometer (not shown) for measuring a temperature of the battery cell 10 heated by the heating plate 50 and a pressure gauge (not shown) for measuring a pressure applied to the battery cell 10 by the pressing device 60 may be further provided.

The thermometer and the pressure gauge may continuously provide information to a controller (not shown) of the heating plate (and the pressing device). The controller may receive the information to control the heating plate (and the pressing device) so that a temperature and pressure required from the battery cell 10 are applied.

Also, the apparatus may further comprise an air-conditioner that cools the heated battery cell 10 and quickly discharges heated air.

Embodiment 2

Furthermore, the present invention provides a method for activating a battery 10 by using the above-described activation apparatus.

A method according to Embodiment 2 of the present invention is a method for activating a battery cell comprising a positive electrode coated with a nickel cobalt manganese (NCM) positive electrode material, into which lithium nickel oxide (LNO) is added or mixed. The method comprises a step of charging the battery cell 10 and a step of discharging the battery cell 10. The charging step and the discharging step are repeatedly performed at least once or at least two times. In the step of charging the battery cell 10, the battery cell 10 is charged under a charging condition of C-rate of 0.1 C to 0.5 C in a state of being heated at a temperature of 45° C. to 60° C. For reference, 1 C-rate means an amount of current that is used for 1 hour when the battery cell is fully charged, 0.1 C means an amount of current at which the battery cell is fully charged when charged for 10 hours, and 0.5 C means an amount of current, at which the battery cell is fully charged when charged for 2 hours.

In more detail, the battery cell 10 may be charged under a charging condition of C-rate 0.2 C in a state of being heated up to a specific temperature of 45° C. to 60° C. (an amount of current at which the battery cell is fully charged when charged for 5 hours).

In this embodiment, the battery cell 10 may be charged in a state of being fully discharged at a charging rate of 0%. When charged, a pressure for pressing the battery cell 10 is additionally applied (by the activation apparatus comprising the above-described constituents). The pressure is divided into a first pressure applied to the battery cell in a first charging interval, which is determined from a charging rate of 0% to a reference charging rate and a second pressure applied to the battery cell in a second charging interval, which is determined from the reference charging rate to a charging rate of 100%.

Here, the second pressure is higher than the first pressure. In this embodiment of the present invention, the first pressure is set at a pressure less than 0.1 kgf/cm$^2$, and the second pressure is set at a pressure of 0.1 kgf/cm$^2$ to 0.5 kgf/cm$^2$.

Also, the reference charging rate is set within a range of a charging rate of 10% to 20%, more particularly, a charging rate of 15% to 19%.

As described above, the battery cell is fully charged from a charging rate of 0% to a charging rate of 100%, and then, the battery cell is discharged at a charging rate of 70% so that the charging rate is adjusted at a charging rate of 30%. That is, the battery cell charged at a charging rate of 100% is discharged at a charging rate of 30% and then is aged under predetermined temperature and humidity conditions. That is, when the charging and discharging are performed under the above-describe conditions so that a solid-electrolyte interphase layer is formed in the battery cell, an aging step of stabilizing the activated battery cell is performed as a post process. Here, the aging step is performed in the same manner as the aging process according to the related art.

It is confirmed that capacity retention of the battery cell activated by the method of the present invention (capacity of how much capacity remains when the battery cell is left for a specific period at a specific temperature) is higher than that of the battery cell activated by the method according to the related art.

Figure 4:
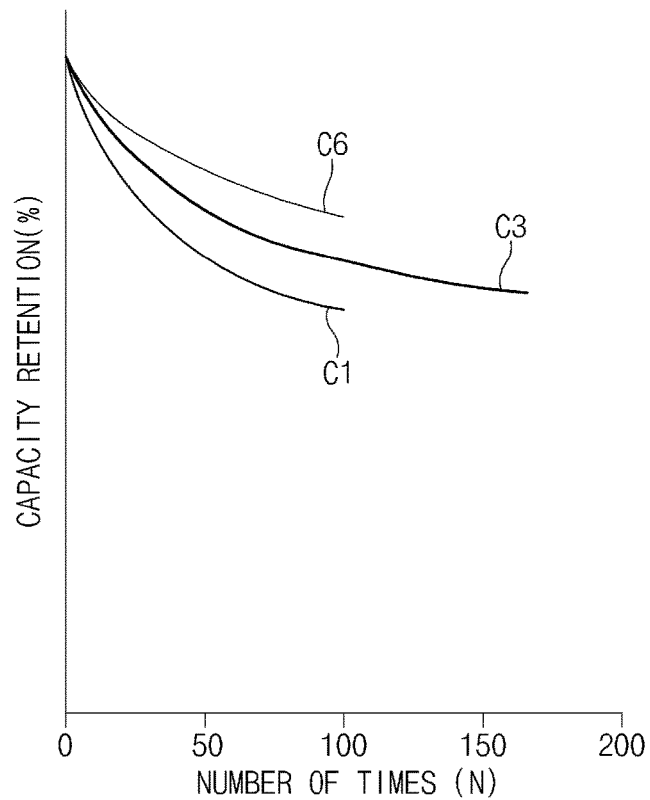
FIG. 4 is a graph illustrating that capacity retention C3 and C6 of battery cells activated according to an activation method of the present invention are higher than that C1 of the battery cell according to the related art.

That is, in FIG. 4, C1 represents capacity retention of the battery cell that is subjected to the aging at room temperature and a high temperature in a state of being charged up to a specific value at a charging rate of 20% to 40% under a charging condition of C-rate 0.1 C at room temperature, C3 represents capacity retention of the battery cell that is charged at a charging rate of 100% under a charging condition of C-rate 0.2 C in a state of being heated at a temperature of 35° C. to 45° C. according to an embodiment of the present invention and then discharged at a charging rate of 20% to 40° to perform the aging at room temperature and the high temperature, and C6 represents capacity retention of the battery cell that is charged at a charging rate of 100% under a charging condition of C-rate 0.2 C in state of being heated at a temperature of 50° C. to 70° C. according to an embodiment of the present invention and then discharged at a charging rate of 20% to 40% to perform the aging at room temperature and the high temperature.

As illustrated in the graph of FIG. 4, it is confirmed that the capacity retention (%) of the battery cell by the activated method according to the present invention is higher than that (%) of the battery cell by the activated method according to the related art. Also, in the activation method of the present invention, since the battery cell is in the pressed state (deviated from the gas generation condition), an effect of suppressing the gas generation compared to the method according to the related art may be expected.

That is, when the activation process is performed according to the present invention having the above-described configuration, the pressing/heating conditions for suppressing the generation of the gas may be provided to prevent the swelling, the battery deformation, and the performance deterioration due to the generation of the gas from occurring. Particularly, even though the LNO is added to the nickel (Ni)-based NCM positive electrode material so as to improve the performance, the conventional problems due to the generation of the gas may be solved.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for activating a battery cell, which activates the battery cell comprising a positive electrode coated with a nickel cobalt manganese positive electrode material, said NCM positive electrode active material comprising lithium nickel oxide, the method comprising:
   a step of charging the battery cell; and
   a step of discharging the battery cell,
   wherein, in the step of charging the battery cell, the battery cell is charged under a charging condition of C-rate of 0.1 C to 0.5 C in a state of being heated at a temperature of 45° C. to 60° C.,
   wherein the battery cell is charged in a state of being fully discharged at a charging rate of 0%,
   a first pressure is applied to the battery cell in a first charging interval, which is determined from a charging rate of 0% to a reference charging rate and a second pressure is applied to the battery cell in a second charging interval, which is determined from the reference charging rate to a charging rate of 100%, and
   the first pressure and the second pressure are different.

2. The method of claim 1, wherein the battery cell is charged under a charging condition of C-rate 0.2 C in a state of being heated at a temperature of 45° C. to 60° C.

3. The method of claim 1, wherein the second pressure is higher than the first pressure.

4. The method of claim 3, wherein the first pressure is set to a pressure less than 0.1 kgf/cm$^2$, and the second pressure is set to a pressure of 0.1 kgf/cm$^2$ to 0.5 kgf/cm$^2$.

5. The method of claim 1, wherein the reference charging rate is set within a range of a charging rate of 10% to 20%.

6. The method of claim 5, wherein the reference charging rate is set within a range of a charging rate of 15% to 19%.

7. The method of claim 1, further comprising a step of discharging the battery cell, which has been charged at a charging rate of 100%, at a charging rate of 20% to 40% and aging the battery cell under predetermined temperature and humidity conditions.

\* \* \* \* \*